United States Patent [19]
Davis et al.

[11] 3,815,406
[45] June 11, 1974

[54] LEAK DETECTOR FOR DETECTING LEAKAGE IN A METER PROVER SYSTEM

[75] Inventors: Billy E. Davis; Ronald G. Dunegan, both of Tulsa, Okla.

[73] Assignee: Signet Controls Incorporated, Tulsa, Okla.

[22] Filed: Oct. 29, 1971

[21] Appl. No.: 193,924

[52] U.S. Cl. .................................... 73/46, 73/49.1
[51] Int. Cl. ............................................ G01m 3/04
[58] Field of Search .............. 73/46, 40, 37, 49.1, 3

[56] References Cited
UNITED STATES PATENTS

| | | | |
|---|---|---|---|
| 277,756 | 5/1883 | Lunkenheimer | 73/46 |
| 2,241,526 | 5/1941 | Rosenkranz | 73/46 |
| 2,573,053 | 10/1951 | Pearlman | 73/40 |
| 2,936,611 | 5/1960 | LeMat et al. | 73/40 X |
| 3,541,837 | 11/1970 | Davis et al. | 73/3 |
| 3,638,475 | 1/1972 | Grove et al. | 73/3 |
| 3,678,730 | 7/1972 | Barrett, Jr. | 73/3 |

*Primary Examiner*—Richard C. Queisser
*Assistant Examiner*—Daniel M. Yasich
*Attorney, Agent, or Firm*—Head & Johnson

[57] ABSTRACT

A leak detector for detecting leakage between adjacent spheres having sealed engagement with a cylinder in a meter prover including a differential pressure switch connected between the spheres and the interior of the cylinder to the opposite side of one of the spheres, and means of altering the pressure between the spheres to actuate the differential pressure switch.

5 Claims, 2 Drawing Figures

PATENTED JUN 11 1974 3,815,406

INVENTORS
BILLY E. DAVIS
BY RONALD G. DUNEGAN

Head & Johnson
ATTORNEYS

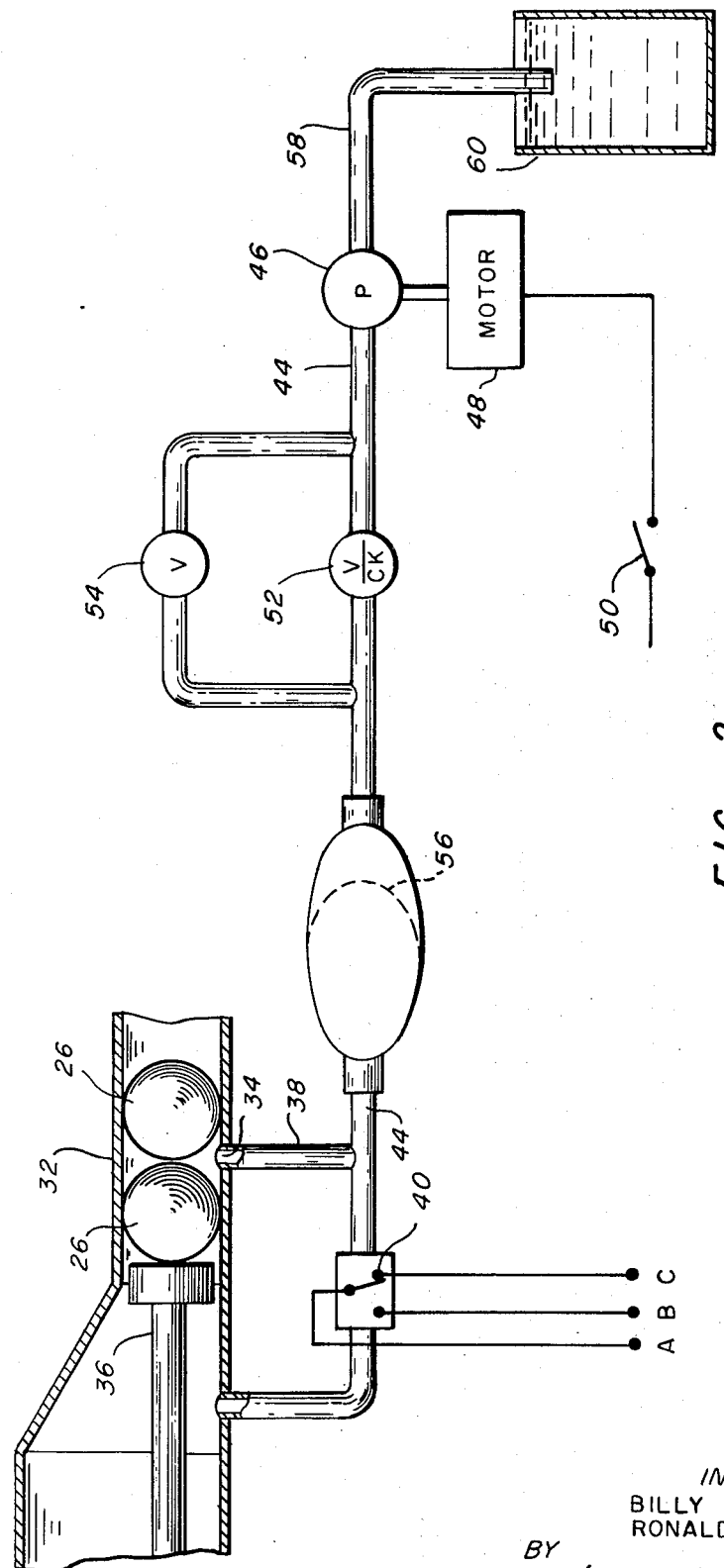

LEAK DETECTOR FOR DETECTING LEAKAGE IN A METER PROVER SYSTEM

BACKGROUND, SUMMARY AND OBJECTS OF THE INVENTION

In the petroleum industry today most fluid measurements are made by meters. In order to assure the accuracy of meters the industry has developed meter proving systems. The system most commonly utilized is to pass a piston, such as a sphere, through a length of constant internal diameter barrel. The barrel is connected in series with the meter being tested. Spaced-apart detectors signal the passing of the sphere past detection points. As the sphere moves between the detection point it sweeps a known volume. By comparing this volume with that indicated by the meter during the period the sphere moves between the detection points the accuracy of the meter can be ascertained and a correction factor determined for the meter.

In order to utilize spheres repeatedly in conducting meter tests it is necessary to provide an arrangement for returning the spheres from the test completion point to the test initiation point. For this purpose a meter prover typically includes an auxiliary or bypass conduit in which each sphere, after completing a passage through the prover barrel, enter to await subsequent useage in a test cycle. In order to insure accuracy of the test procedure it is imperative that no fluid flow through the bypass conduit during the test procedure. Various types of valving systems have been utilized for sealing the bypass conduit during testing procedures. One system of accomplishing the valving function utilizes the spheres themselves. This is illustrated in U.S. Pat. No. 3,541,837. For this purpose the bypass conduit includes a cylinder portion of an interior diameter sealably engaging the exterior diameter of the spheres. While one sphere in the cylinder will serve to accomplish the valving function, a preferred arrangement includes the use of two spheres in the cylinder during each test procedure. An opening is provided in the cylinder communicating with the area between the two spheres. A small valve normally closes the opening. By opening the small valve the effectiveness of the seal obtained by the two adjacent spheres can be ascertained since fluid pressure within the proving system will force fluid flow out through the small valve if leakage is occurring past one of the spheres.

While such arrangement of detecting leakage between adjacent spheres in a meter prover system is satisfactory it has certain disadvantages. A basic problem is that it requires the memory and the attention of the operator to open the small valve and observe whether or not there is fluid flow from the valve. There is always pressure in the cylinder in a prover system so that when the operator first opens the small valve some fluid flow usually occurs. Only by observing that the fluid flow decreases and does not continue can the operator visually ascertain that no leakage past the spheres is occurring. This diverts the operator's attention to the detail of insuring that no leakage is occurring between the spheres during a test procedure and away from other aspects of the test procedure. In addition, such a system does not provide automatic means for insuring leakproof sealing of the bypass conduit.

It is an object of this invention to provide a leak detector for detecting leakage between adjacent spheres having sealed engagement with a cylinder in a meter proving system which overcomes the disadvantages and limitations of known leak defecting systems.

Another object of this invention is to provide a leak detector for detecting leakage between adjacent spheres having sealed engagement of automatically indicating leakage or absence of leakage between the spheres.

Another object of this invention is to provide a leak detector for detecting leakage between adjacent spheres having sealed engagement with a cylinder in a meter prover wherein no fluid passes out of the meter prover system.

These and other objects will be understood from the following description and claims, taken in conjunction with the attached drawings.

DESCRIPTION OF THE VIEWS

FIG. 2 is a diagram, showing a portion of a typical meter prover, and showing an alternate embodiment of the leak detector of this invention.

DETAILED DESCRIPTION

Figure 1:
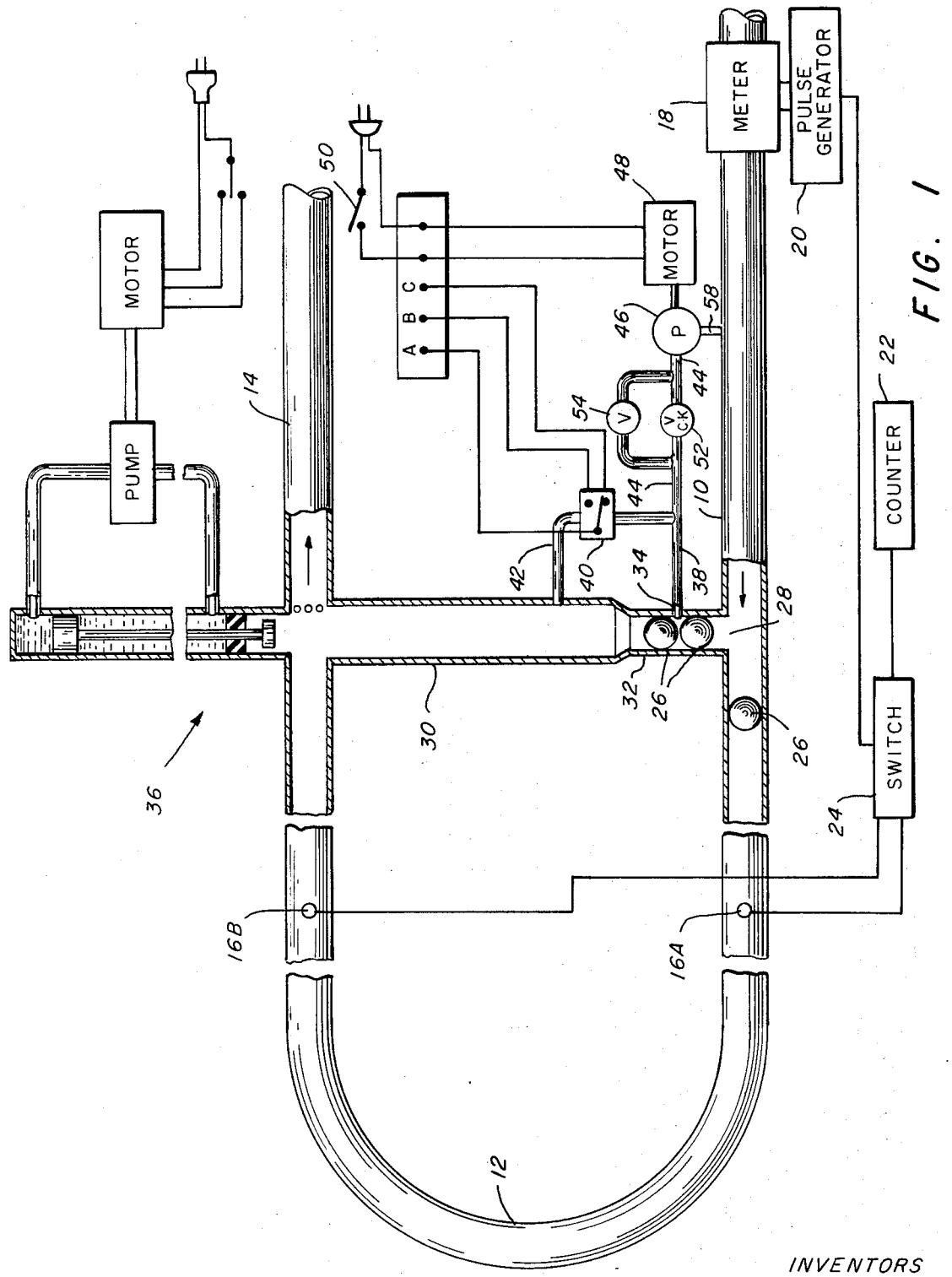
FIG. 1 is a diagram of a meter prover including one embodiment of the leak detector of this invention.

Referring to the drawings and first to FIG. 1, a meter prover system is shown, including a leak detector of this invention. It is understood that this invention is limited only to the leak detector portion and not to the meter prover arrangement itself and that the actual arrangement of the meter prover system to which the leak detector is applied may vary considerably. Typically the meter prover system includes an inlet conduit 10 through which fluid flows into the system, a meter barrel 12 whih functions as a test barrel, an outlet conduit 14 by which fluid flows out of the system, sphere detectors 16A and 16B by which signals are given indicating the passage of a sphere into and out of the prover barrel section, and a meter 18 being tested which registers the quantity of fluid flowing through conduit 10. Meter 18 has a pulse generator for generating electrical pulses in proportion to the volume of fluid passing through the meter. The electrical pulses from pulse generator 20 pass to a pulse counter 22 through a switch 24.

Switch 24 initiates a count in counter 22 when a sphere passes detector 16A and terminates the count when the sphere passes detector 16B, the total count registerd by counter 22 being representative of that generated by the volume of fluid by a sphere passing between detector 16A and 16B. This count is then compared with the meter reading for providing indication of the accuracy of the meter and for affording means of computing a meter correction factor.

The interior of the meter loop 12 is swept, as previously indicated, by a sphere 26, which is introduced into the barrel at opening 28. Sphere 26 must be returned to the opening and for this purpose a bypass conduit 30 is provided between conduits 10 and 14. Each sphere 26, after making passage through the barrel 12 is returned to bypass conduit 30 to await reusage in a subsequent test cycle. In a preferred arrangement multiple spheres 26 are utilized so that two spheres remain at all times in cylinder portion 32 of the return conduit 30. The spheres 26 in cylinder portion 32 function as a valve to insure that all fluid flowing through inlet conduit 10 after having passed through meter 18, passes through the meter barrel 12 and none short cuts through the bypass conduit 30.

In order to move a sphere from the return conduit 30 to the inlet opening 28 some means must be provided for forcing the spheres through the opening 28. Such means is indicated generally by the numeral 36. Since it forms no part of this invention such means will not be described in detail and reference is made to previously mentioned U.S. Pat. No. 3,541,837 which reveals means of accomplishing the launching of a sphere.

As previously indicated, while one sphere 26 in cylinder 32 would function as a valve the use of two spheres is preferred and permits the incorporation of a small opening 34 in the cylinder 32 between the spheres. As previously indicated the present practice is to provide a valve in small opening 34 which can be opened to visually indicate leakage past the spheres. This invention provides an improved means for automatically indicating leakage which may occur past the spheres in cylinder 32.

Communicating with opening 34 is a small diameter conduit 38 which connects to one side of a differential pressure switch 40. The other side of the differential pressure switch is connected by conduit 42 to the interior of cylinder 32 to the opposite side of one of the spheres 26. Differential pressure switch 40 is preferably a two position switch giving one electrical indication when zero or some minimum differential pressure exists across the switch, and giving another indication when a differential pressure having at least a preselected value exists across the switch.

Connected to conduit 38 is an intake conduit 44 which extends to a small pump 46. A motor 48 operates the pump 46 and when energized, such as by means of switch 50, actuates pump 46 to apply suction to intake conduit 44. In series with pump 46 is a check valve 52 which is paralleled by a bypass valve 54.

With the spheres 26 in position in cylinder 32 the operator may actuate the leak detector by energizing motor 48 and thereby pump 46, pulling fluid through conduit 44, check valve 52, and conduit 38. This reduces the pressure within conduit 38 relative to conduit 42. In normal position the differential pressure switch 40 provides electrical continuity between common point A and point C. When the differential pressure switch 40 actuates contact is removed from point C and made with point B. When contact is made with point B motor 48 may be deenergized. Check valve 52, with bypass valve 54 closed, serves to maintain the pressure differential between conduit 38 and conduit 42 as long as no leakage occurs past a sphere 26 within cylinder 32. If leakage occurs past either of the spheres 26 in cylinder 32 the pressure differential will normalize, or at least fall to a preselected minimum differential pressure, at which time switch 40 will actuate removing contact with point B, indicating failure of the seal provided by spheres 26 in cylinder 32. The electrical signals at points A, B, and C may be utilized in the meter proving test sequence to automatically obviate any test procedure in which contact is not continuously maintained between points A and B. thereby insuring that throughout the test procedure the spheres 26 functioned as leakproof seals in cylinder 32.

It can be seen that rather than conduit 44 constituting the intake of pump 46 such may constitute the discharge of pump 46, with the direction of closure of check valve 52 being reversed. In this arrangement pump 46 would serve to pump a pressure into the area between the spheres 26 in cylinder 32 for actuation of the differential pressure switch 40, such pressure being greater than that which exists in the interior of the cylinder 32 to either side of either of the spheres 26. Thus the system functions as long as it serves to impart a differential pressure in the space between the spheres compared to that to either side of the spheres.

Bypass valve 52, when opened, serves to permit pressure differential between the spheres to be released. In the arrangement of FIG. 1 pump 46 discharges by way of conduit 58, directly into the prover system, such as into inlet conduit 10 as shown. Pump 46 utilizes the fluid which is being tested, the fluid being returned directly to the system.

FIG. 2 shows an alternate embodiment of the invention. In series with conduit 44 is a bladder type transfer barrier 56. The discharge conduit 58 connects to a receptacle 60. When pump 46 is energized fluid is drawn through conduit 39 causing a differential pressure across switch 40. The transfer barrier 56 serves to freely pass pressure changes in conduit 44 without permitting fluid flow. In the arrangement of FIG. 2 pump 46 may utilize only clean hydraulic fluid. The embodiment of FIG. 1 will be preferred when the fluid which flows through the prover is of a quality which will not likely impair pump 46, check valve 52, bypass valve 54, and so forth, while the arrangement of FIG. 2 will be preferred when the fluid which flows through the meter prover system is contaminated with dirt, chemicals, or other components which might impair the leak detector system.

While the invention has been described with a certain degree of particularity it is manifest that many changes may be made in the details of construction and the arrangement of components without departing from the spirit and scope of this disclosure. It is understood that the invention is not limited to the arrangement set forth herein for purposes of exemplification, but is limited only by the scope of the attached claim or claims, including a full range of equivalency to which each element or step thereof is entitled.

What is claimed is:

1. A leak detector for detecting leakage between adjacent spheres having sealed engagement with a cylinder portion of a return conduit in a meter prover, the cylinder having a first opening between the spheres and a second opening to the opposite side of one of the spheres, comprising:
a differential pressure switch connected in a conduit, said conduit having one side connected to said first opening and the opposite side connected to the said second opening;
means connected with said first opening for providing a pressure between the spheres different from the pressure at the second opening and in communication with said one side of the differential pressure switch to provide a pressure differential thereacross for actuation thereof, said differential pressure switch being deactuated when the differential pressure drops a predetermined amount due to leakage between said spheres for detecting said leakage.

2. A leak detector for a meter prover according to claim 1 wherein said last mentioned means includes:

an electric drive pump in communication with the cylinder between the spheres through the first opening.

3. A leak detector for a meter prover according to claim 2 including a check valve interposed between said pressure differential switch and said pump.

4. A leak detector for detecting leakage between adjacent spheres having sealed engagement with a cylinder portion of a return conduit in a meter prover, the cylinder having a first opening between the spheres and a second opening to the opposite side of one of the spheres, comprising:

a differential pressure switch having one side connected to said first opening and the opposite side connected to the said second opening;

means connected with said first opening for providing a pressure between the spheres different from the pressure at the second opening and in communication with said one side of the differential pressure switch to provide a pressure differential thereacross for actuation thereof, said differential pressure switch being deactuated when the differential pressure drops a predetermined amount due to leakage between said spheres for detecting said leakage;

said means connected with said first opening including an electric drive pump in communication with the cylinder between the spheres through the first opening; and a transfer barrier between said pump and the cylinder, the barrier being flexible for transferring fluid pressure between the pump and the cylinder but precluding fluid flow therebetween.

5. A leak detector for detecting leakage between adjacent spheres having sealed engagement with a cylinder portion of a return conduit in a meter prover, the cylinder having a first opening between the spheres and a second opening to the opposite side of one of the spheres, comprising:

a differential pressure switch connected in a conduit, said conduit having one side connected to said first opening and the opposite side connected to the said second opening;

means connected with said first opening for providing a pressure between the spheres different from the pressure at the second opening and in communication with said one side of the differential pressure switch to provide a pressure differential thereacross for actuation thereof, said differential pressure switch being deactuated when the differential pressure drops a predetermined amount due to leakage between said spheres for detecting said leakage;

said means connected with said first opening includes an electric drive pump in communication with the cylinder between the spheres through the first opening; and said pump is disposed between the said first opening in the cylinder between the spheres and the said second opening in the cylinder to the opposite side of one of the spheres.

* * * * *